UNITED STATES PATENT OFFICE.

OTTO ERNST HEUSCHKEL, OF VICTORIA DOCKS, ENGLAND.

MANUFACTURE OF ARTIFICIAL MARBLE.

1,094,366.  Specification of Letters Patent.  Patented Apr. 21, 1914.

No Drawing.  Application filed May 20, 1911. Serial No. 628,553.

*To all whom it may concern:*

Be it known that I, OTTO ERNST HEUSCHKEL, a subject of the German Emperor, residing at No. 1ᴬ Bradfield road, Victoria Docks, in the county of Middlesex, England, have invented new and useful Improvements in and Connected with the Manufacture of Artificial Marble, of which the following is a specification.

This invention relates to improvements in and connected with the manufacture of artificial marble from a waste product and wherein tannic acid is obtained as a by-product.

According to this invention leather waste or leather cuttings is or are freed from tannic acid as described below and the leather waste is reduced to the form of powder, which latter is put into a solution of magnesium carbonate in hydrochloric acid or sulfuric acid or a mixture of the two acids to which magnesium oxid is added, a suitable temperature being maintained. By this means a substance is formed of about the consistency of treacle or it may be in the form of a plastic mass, which may either be run or spread on to a floor or surface of metal, stone, glass, wood or other suitable material or cast in molds. The product so obtained sets or solidifies after some time into a solid, non-combustible or fire-proof mass according to the temperature utilized.

According to one method of manufacture, a ton of leather cuttings or waste is soaked in 45 gallons of a hot alkaline solution consisting for instance of 45 gallons of water and 14 pounds of caustic soda or caustic potash. After steeping in this solution for say 12 hours the liquid is drawn off, filtered and neutralized by adding any suitable acid or acid salt such as for example bisulfate of soda and the tannic acid is recovered in a solution of any desired density, by for example, boiling *in vacuo*. The pulpy mass resulting from the leather is then treated with a hot acid solution consisting of, say, 15 gallons of hydrochloric or sulfuric acid or a mixture of both at a temperature of about 170° F. whereby the remaining tannic acid is converted into sugar or similar carbohydrate and gallic acid and a tough lumpy mass results. To prevent the development of sulfureted hydrogen and for removing empyreumatic matter which would have the effect of causing the material to have a penetrating smell and to cohere to a considerable extent, the mass is treated for 4 hours with 2 gallons of a solution of permanganate of potash. When the liquid has been removed or absorbed and the mass has been dried at a temperature of, say, 180° F. for 2½ hours whereby the gallic acid is transformed into pyrogallic acid, the mass is put into 365 gallons of a solution of magnesium carbonate in hydrochloric acid (29 hundredweights of magnesium carbonate to 365 gallons of hydrochloric acid) to which 10 hundredweights of magnesium oxid are added until a semi-liquid or plastic mass is obtained, which may be spread or poured into molds or on surfaces of mineral, metal, glass, wood or other suitable material. The color and veining are black and white but it is evident that any suitable coloring matter may be added in the course of the process to imitate marble of different kinds and colors. The finished product has a smooth polished surface, providing the surface on to which it is run or cast is smooth, the product has a structure and produces a sound, when struck, similar to real marble and it may be worked in any well known manner. It should however be clearly understood that the invention is not limited to the method of manufacture just described which is only given as an example.

What I claim as my invention and desire to secure by Letters Patent of the United States is:—

1. The method of manufacturing artificial marble consisting in treating leather pieces with alkaline solution for removal of tannic acid, treating the leather-like residue to prevent cohesion of the particles, mixing therewith a solution of magnesium carbonate in acid to which magnesium oxid is added so that the whole forms a plastic mass and drying the resulting product.

2. Method of manufacturing artificial marble consisting in soaking leather pieces in hot alkaline solution, separating said solution from the leather, treating the latter with acid at a temperature suitable for conversion of remanent tannic acid into carbohydrate and gallic acid, treating the leather mass to prevent cohesion of the particles, drying the mass, mixing therewith a solution of magnesium carbonate in acid to which magnesium oxid is added so that the whole forms a plastic mass and drying the resulting product.

3. Method of manufacturing artificial marble consisting in soaking leather pieces in hot alkaline solution, separating said solution from the leather, treating the latter with acid at a temperature suitable for conversion of remanent tannic acid into carbohydrate and gallic acid, treating the leather mass to prevent cohesion of the particles, drying the mass at a temperature and for a period of time suitable for converting the gallic acid into pyrogallic acid, reducing the leather-like residue to a more or less finely divided condition, mixing therewith a solution of magnesium carbonate in acid to which magnesium oxid is added so that the whole forms a plastic mass, and drying the resulting product.

4. Method of manufacturing artificial marble consisting in soaking leather pieces in hot alkaline solution, separating said solution from the leather, treating the latter with acid at a temperature suitable for conversion of remanent tannic acid into carbohydrate and gallic acid, treating the mass with a solution of permanganate of potash for the prevention of the development of sulfureted hydrogen and for the removal of empyreumatic matter, and for preventing cohesion of the particles, drying the mass, reducing the leather-like residue to a more or less finely divided condition, mixing therewith a solution of magnesium carbonate in acid to which magnesium oxid is added so that the whole forms a plastic mass, and drying the resulting product.

5. Method of manufacturing artificial marble consisting in soaking leather pieces in an alkaline solution, separating the solution from the mass, treating the mass with acid at a suitable temperature for the conversion of the remanent tannic acid into carbohydrate and gallic acid, soaking the mass in a solution of permanganate of potash to prevent cohesion of the particles, drying the mass at a suitable temperature for the conversion of gallic acid into pyrogallic acid, mixing the mass with a solution of magnesium carbonate in acid with an addition of magnesium oxid, and drying the mass.

In testimony whereof I have signed my name to this specification in the presence of two subscribing witnesses.

OTTO ERNST HEUSCHKEL.

Witnesses:
W. MORBEY,
R. WILSON.